(12) United States Patent
Fujita

(10) Patent No.: US 7,253,538 B2
(45) Date of Patent: Aug. 7, 2007

(54) METHOD OF SUPPLYING ELECTRIC POWER FROM SHORE TO SHIP AND SYSTEM THEREOF

(75) Inventor: Masumi Fujita, Shimonoseki (JP)

(73) Assignee: Japan Radio & Electric Mfg. Co., Ltd., Shimonoseki-shi (JP)

(*) Notice: Subject to any disclaimer, the term of this patent is extended or adjusted under 35 U.S.C. 154(b) by 239 days.

(21) Appl. No.: 11/057,158

(22) Filed: Feb. 15, 2005

(65) Prior Publication Data

US 2005/0184589 A1 Aug. 25, 2005

(30) Foreign Application Priority Data

Feb. 20, 2004 (JP) ............................. 2004-045126

(51) Int. Cl.
*H02M 5/45* (2006.01)
(52) U.S. Cl. .......................................... 290/53; 307/18
(58) Field of Classification Search ................... 290/53
See application file for complete search history.

(56) References Cited

U.S. PATENT DOCUMENTS

| | | | | |
|---|---|---|---|---|
| 2,410,678 A | * | 11/1946 | Parkhurst .................... | 307/64 |
| 2,911,541 A | * | 11/1959 | Neufville et al. ............ | 290/4 R |
| 3,808,451 A | * | 4/1974 | Pittet .......................... | 307/64 |
| 5,790,399 A | * | 8/1998 | Campbell .................... | 700/295 |
| 5,804,953 A | * | 9/1998 | Bowyer et al. .............. | 323/256 |
| 5,920,467 A | * | 7/1999 | Bowyer et al. .............. | 363/37 |
| 6,208,038 B1 | * | 3/2001 | Campbell .................... | 307/18 |
| 6,329,725 B1 | * | 12/2001 | Woodall et al. ............. | 307/19 |
| 7,080,449 B2 | * | 7/2006 | Aldridge et al. ............ | 29/854 |
| 2003/0048004 A1 | * | 3/2003 | Fleming et al. ............. | 307/64 |
| 2006/0108882 A1 | * | 5/2006 | Michalko .................... | 310/83 |

FOREIGN PATENT DOCUMENTS

| | | |
|---|---|---|
| JP | 07-236236 A | 9/1995 |
| JP | 2000-139041 A | 5/2000 |
| JP | 2000-217275 | 8/2000 |
| JP | 2000-217275 A | 8/2000 |
| JP | 2000-280985 | 10/2000 |
| JP | 2000-280985 A | 10/2000 |

OTHER PUBLICATIONS

Office Action dated Aug. 29, 2006 issued in corresponding Japanese Patent Application No.: 2004-045126.

* cited by examiner

*Primary Examiner*—Joseph Waks
(74) *Attorney, Agent, or Firm*—Westerman, Hattori, Daniels & Adrian, LLP.

(57) ABSTRACT

A method and a system of supplying electric power from shore to a ship with generators 60, 61, the ship being berthed in port include: a first step of synchronizing the electric power 11 from shore with electric power from the generators 60, 61, a second step of carrying out temporary parallel operation of the electric power 11 from shore and the electric power from the generators 60, 61 after the synchronization, and a third step of shutting off the electric power from the generators 60, 61 to supply the electric power 11 from shore to the ship after the temporary parallel operation. According to the method and system, electric power supply interruption can be prevented when a shore power source is changed over to an onboard power source, and vice versa. Also, onboard control devices can be smoothly operated even on the way of changing over the power sources.

4 Claims, 2 Drawing Sheets

[Fig. 1]
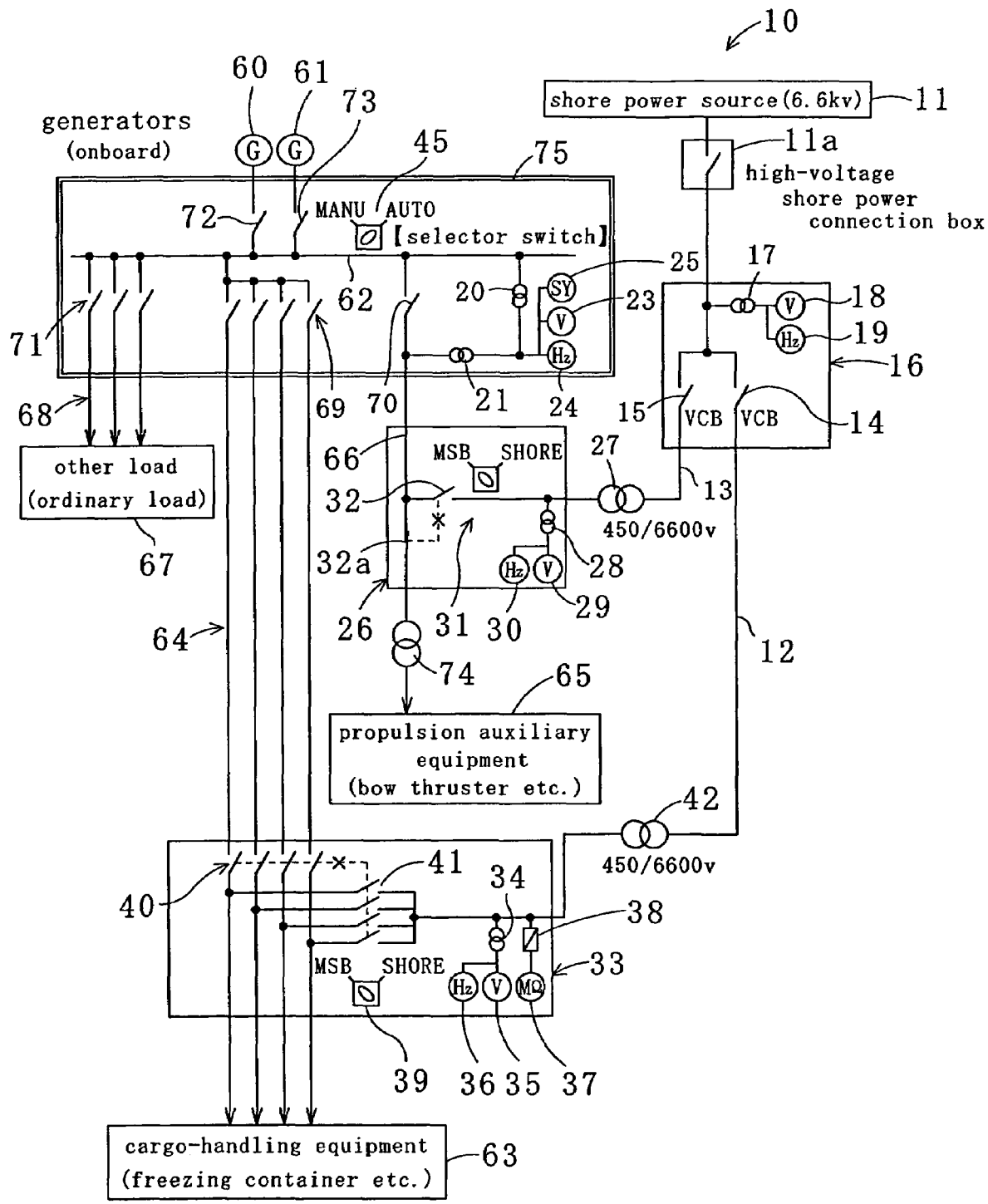

[Fig. 2] PRIOR ART
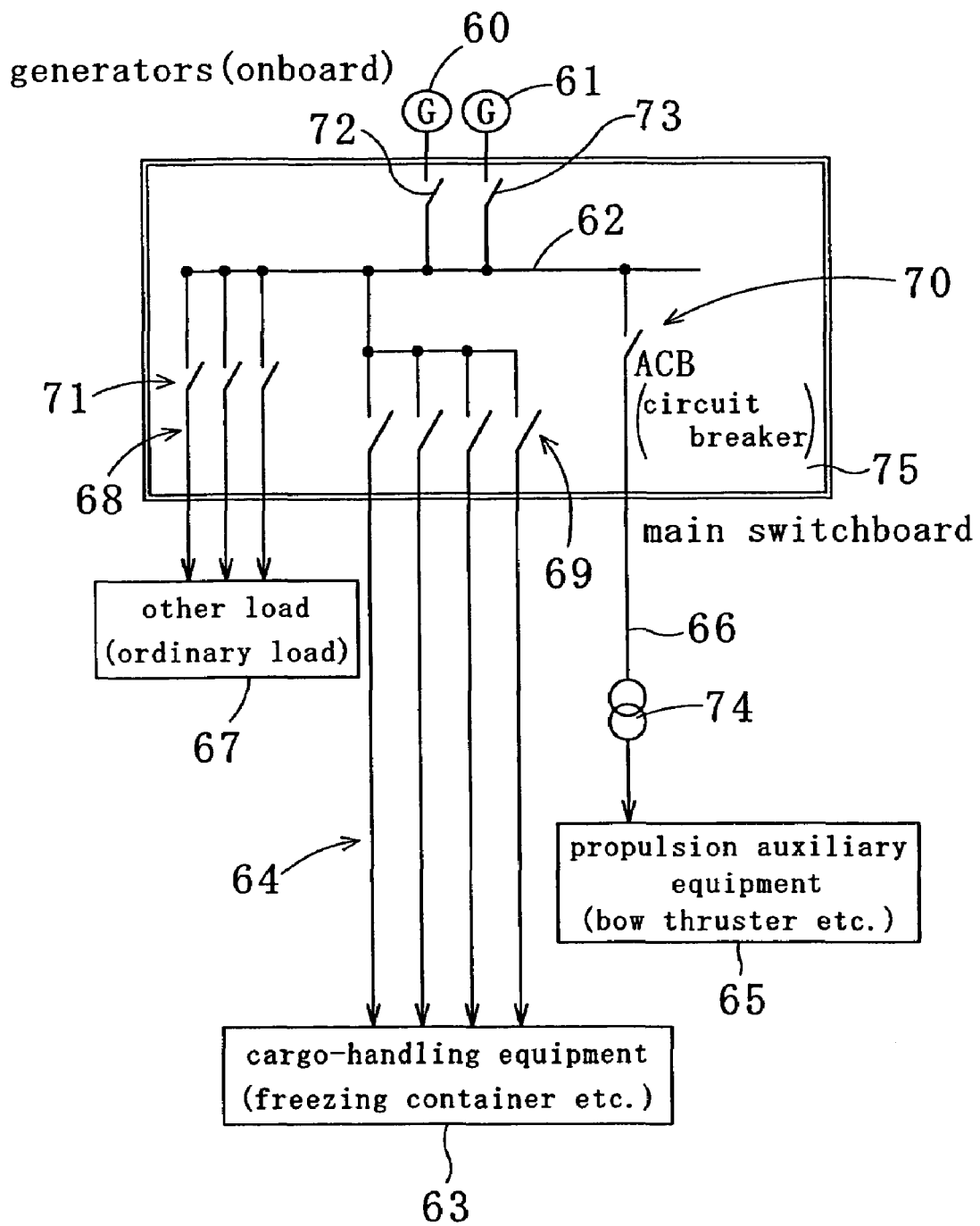

METHOD OF SUPPLYING ELECTRIC POWER FROM SHORE TO SHIP AND SYSTEM THEREOF

BACKGROUND OF THE INVENTION

1. Technical Field

The present invention relates to a method of supplying high-voltage and large-capacity electric power from shore to a ship berthed in port, and a system thereof.

2. Description of the Related Prior Art

Generally, entire electric power for a ship is supplied by driving a generator with a turbine or engine as is known in e.g., Japanese Laid-Open Patent Publication 2000-217275. However, in a case that the ship is berthed in port for a long period of time or a short period of time, when the ship has equipment consuming a large amount of electric power such as a freezing container, an engine (generator) of the ship must be kept in operation while the ship is berthed. Consequently, a large amount of exhaust gas is generated, and it causes air pollution and marine pollution. In order to avoid such problems, it is recommended in recent years to stop the engine (generator) of the ship and to supply electric power from shore to the ship while the ship is berthed alongside the quay.

FIG. 2 illustrates a conventional electric power supply system in a ship. As illustrated in the figure, the ship is equipped with a main bus bar 62 to which generators 60, 61 are connected. Power lines 64 for large load such as cargo-handling equipment 63 (a freezing container, for example) are connected to the main bus bar 62 via circuit breakers 69. A power line 66 for propulsion auxiliary equipment 65 such as a bow thruster as disclosed in e.g., Japanese Laid-Open Patent Publication 2000-280985, a side thruster, etc. is connected to the main bus bar 62 via a circuit breaker 70. Also, power lines 68 for ordinary load 67 such as onboard lighting equipment, electronic devices, or the like (other load) are connected to the main bus bar 62 via circuit breakers 71. Circuit breakers 72, 73 disposed between the main bus bar 62 and the generators 60, 61, and the circuit breakers 69 to 71 are installed in a main switchboard 75. A reference number 74 denotes a step-up transformer disposed between the power line 66 and the propulsion auxiliary equipment 65.

Generally, when electric power supplied from the generators 60, 61 is changed over to the electric power from shore, supply of the electric power from the generators 60, 61 to the main bus bar 62 is halted, and then the electric power from shore is supplied to the main bus bar 62. Thus, a short-time interruption of power supply is inevitable.

However, in the above method of changing over power sources, the electric power supply to the ship is interrupted temporarily, and consequently there have been problems such that onboard control devices including computers are reset.

In order to avoid the problems, it may be devised to change over from a power source of generators to a power source supplied from shore after frequencies and voltages of the power sources are matched (i.e., synchronized). In case of a large ship, the electric power necessary for the ship is supplied by driving several generators in parallel, and complicated computer control has been taken in order to allocate load to the generators while keeping frequencies of the plural generators constant. In such case, adjusting the frequencies of the plural generators in operation to the frequency of the power source from shore has not been carried out generally, since such adjustment is very difficult. Furthermore, when a large capacity of electric power is supplied from shore, a power line for receiving the electric power from shore must be connected to a main switchboard, which not only requires large-scale modifications inside the ship but also imposes burdens on an entire system of the ship. In some cases, since the electric power from shore is too large, there is little space in the main switchboard to install necessary equipment.

SUMMARY OF THE INVENTION

The present invention has been made to overcome the above drawbacks of the prior arts, and accordingly the first object of the invention is to provide a method of supplying electric power from shore to a ship and a system thereof which are capable of preventing occurrence of power supply interruption when an onboard power source is changed over to a power source from shore, and further capable of securing a smooth operation of onboard control devices even on the way of changing over the power sources.

Further, the second object of the present invention is to provide a more economical method of supplying electric power from shore to a ship and a system thereof which do not require unnecessary wiring or modifications for changing over a power source supplied to the ship from onboard generators to the power source from shore.

The first aspect of the present invention according to the objects discloses a method of supplying electric power from shore to a ship with at least one generator, the ship being berthed in port, comprising: a first step of synchronizing the electric power from shore with electric power from the generator, a second step of carrying out temporary parallel operation of the electric power from shore and the electric power from the generator after the synchronizing of the first step, and a third step of shutting off the electric power from the generator to supply the electric power from shore to the ship after the temporary parallel operation of the second step. According to the first aspect of the invention, the power sources supplied to the ship can be changed over without occurrence of instantaneous interruption of power supply etc. Consequently, the changeover of the power sources has no adverse effect on onboard control devices, and thereby operations in the ship using electrical equipment can be performed continuously.

The second aspect of the invention according to the objects discloses a method of supplying electric power from shore to a ship according to the first aspect of the invention, the ship being provided with cargo-handling equipment usually supplied with the electric power from the generator, the cargo-handling equipment requiring a large capacity of electric power, wherein a line of the electric power from shore is divided into a second line and a first line, the second line being used to supply the electric power from shore to the cargo-handling equipment directly, the first line being used to supply the electric power from shore to ordinary load through a main switchboard, comprising: a first process of supplying the electric power from shore to the cargo-handling equipment by connecting the second line to the cargo-handling equipment directly after shutting off the electric power from the generator to the cargo-handling equipment, and a second process of supplying the electric power from shore to the ordinary load via the first line and the main switchboard by carrying out the first step to the third step.

By the effect of the second aspect of the invention, the power source for the ordinary load in the ship is smoothly changed over from the power source from the generator to the power source from shore, and thereby no momentary interruption of power supply etc. occurs during the changeover. Besides, in the second aspect of the invention, since electric power has been already supplied from shore to the cargo-handling equipment through the second line, the generator supplies electric power only to the ordinary load (through the main switchboard) during the changeover. Therefore, the output of the generator is low. And synchronizing the electric power from the generator and the electric power from shore becomes easier. Thus, the parallel operation of the electric power from the generator and shore can be carried out smoothly. As the cargo-handling equipment is load such as motors of a freezing container, crane, or the like, temporary interruption of power supply does not cause problems for the cargo-handling equipment. Therefore, the changeover from the electric power from the generator to the electric power from shore is carried out after the electric power from the generator is shut off once. If continuous power supply is required for controllers of cargo-handling equipment etc., it is preferable that an auxiliary power supply device including an auxiliary battery and an inverter is connected to the controllers, or that a control circuit alone receives the electric power through the first line.

Also, in the second aspect of the invention, changing over to the temporary parallel operation of the second step is carried out while the electric power from the generator is supplied to the ordinary load. Accordingly, the electric power can be changed over smoothly by the temporary parallel operation without interruption of power supply to the ship or without a transient phenomenon on the generator.

In the second aspect of the invention, in a case where the ship is equipped with propulsion auxiliary equipment requiring a large capacity of electric power as well as with the cargo-handling equipment and the ordinary load, it is preferable that a power line for the propulsion auxiliary equipment is used reveresly to supply the electric power from shore which is transmitted through the first line to the ordinary load in the ship. The reason for this is that large-diameter electric cables for large electric power are generally used for the power line for the propulsion auxiliary equipment, and that the propulsion auxiliary equipment is not used while the ship is berthed in port. Therefore, modifications to add a power line to the main switchboard can be omitted by using a part or the whole of the power line for the propulsion auxiliary equipment when the electric power from shore is supplied to the main switchboard. As a result, modification work on the main switchboard such as introduction of power cables, circuit breakers, etc. to receive the electric power from shore can be minimized, and thereby equipment cost can be reduced.

The third aspect of the invention according to the objects discloses a system for supplying electric power from shore to a ship berthed in port, the ship being provided with not only ordinary load including onboard lighting equipment and electronic devices but also propulsion auxiliary equipment and cargo-handling equipment which respectively require a large capacity of electric power, comprising: an electric power-receiving switchboard receiving the electric power from shore, the electric power-receiving switchboard including circuit breakers respectively connected to divided first and second lines for turning on and off the electric power from shore to the first and second lines; a first switchboard operable to change over from the first line to a power line for the propulsion auxiliary equipment by using a first changeover switch; a second switchboard operable to change over from the second line to a power line for the cargo-handling equipment by using a second changeover switch; and switching devices including a first circuit breaker and a second circuit breaker, the first circuit breaker closing after synchronization of the electric power from a generator and the electric power from shore transmitted via the power line for the propulsion auxiliary equipment, the second circuit breaker opening to shut off the electric power from the generator to the ordinary load via a main bus bar after temporary parallel operation of the electric power from shore and the electric power from the generator. Here, the synchronization means to adjust the voltages, frequencies and phases between the electric power from the generator and the electric power from shore so as to connect the both electric powers electrically. The first switchboard can disconnect the propulsion auxiliary equipment from the power line for the propulsion auxiliary equipment, and connect the first line to the power line for the propulsion auxiliary equipment by using the first changeover switch, and vice versa. The second switchboard can stop supply of the electric power from the generator to the cargo-handling equipment, and connect the second line to the cargo-handling equipment by using the second changeover switch, and vice versa. After the changeover, the ordinary load is supplied with the electric power from shore through the first switchboard by using the power line for the propulsion auxiliary equipment.

In the system for supplying electric power from shore to a ship according to the third aspect of the invention, since devices are disposed within the electric power-receiving switchboard, the first switchboard, and the second switchboard, modifications of the main switchboard become minimum, the main switchboard where important operations are carried out being installed in a limited-spaced engine room. Thus, the power supply system of the present invention is very effective for an existing ship. Also, the power supply system can be easily introduced to a ship to be newly constructed at a relatively low cost since the system does not place a large burden on the main switchboard.

BRIEF DESCRIPTION OF THE DRAWINGS

FIG. 1 is an electric diagram illustrating an electric power supply system for supplying electric power from shore to a ship according to one embodiment of the present invention.

FIG. 2 is an electric diagram illustrating an electric power supply system of a ship according to prior art.

DESCRIPTION OF THE PREFERRED EMBODIMENT

Referring to FIG. 1, the embodiment of the present invention will be explained hereinafter for the purpose of good understanding of the invention. In FIG. 1, each line is shown in a single line, but is normally composed of two power lines (in a case of single phase) or three power lines (in a case of three phases). In FIG. 1, the same constituent elements (parts and lines, for example) as those of the prior art illustrated in FIG. 2 are provided with the same numbers.

As illustrated in FIG. 1, an electric power supply system 10 for supplying electric power from shore to a ship according to one embodiment of the present invention has an electric power-receiving switchboard 16 which receives electric power 11 from shore (i.e., shore power 11) via a high-voltage shore power connection box (namely a connection terminal box) 11a. In the electric power-receiving switchboard 16, the electric power 11 from shore is divided into a first line 13 and a second line 12. Also, the electric power-receiving switchboard 16 includes circuit breakers (VCB: Vacuum Circuit Breaker) 15, 14 respectively turning on and off the electric power on the first line 13 and the second line 12. In addition, a voltmeter 18 and a frequency meter 19 are connected via a transformer 17 to a primary line of the circuit breakers 14, 15 in the electric power-receiving switchboard 16 in order to monitor the voltage of received electric power.

At the same time, existing generators 60, 61, and a main switchboard 75 connected thereto are provided in the ship. The main switchboard 75 has a main bus bar 62 to which the generators 60, 61 are connected via second circuit breakers 72, 73, respectively. Also, a power line 66 for propulsion auxiliary equipment 65 is connected to the main bus bar 62 via a first circuit breaker 70. Power lines 64 for cargo-handling equipment 63 are connected to the main bus bar 62 via circuit breakers 69. Power lines 68 for ordinary load 67 are connected to the main bus bar 62 via circuit breakers 71.

Furthermore, in the main switchboard 75, voltmeters 23 which respectively measure the voltages of the main bus bar 62 and the power line 66, a switching-type frequency meter 24, and a synchronizer with a synchroscope 25 are connected to the main bus bar 62 and the power line 66 for the propulsion auxiliary equipment 65 via transformers 20, 21.

A first switchboard 26 is connected to the power line 66 connecting the propulsion auxiliary equipment 65 and the main switchboard 75. (The first switchboard 26 can be located at anyplace on the power line 66.) Electric power is supplied from the first line 13 divided from the line of the shore power 11 in the electric power-receiving switchboard 16 to the first switchboard 26 via a step-down transformer 27 (450V/6.6 KV). In the first switchboard 26, a voltmeter 29 and a frequency meter 30 are connected to a secondary line of the step-down transformer 27 via a transformer 28. In addition, the first switchboard 26 includes a first changeover switch 31 that changes over from the power line 66 for the propulsion auxiliary equipment 65 to the first line 13 to supply the electric power 11 from shore. By manually operating the first changeover switch 31, two interlocked circuit breakers 32, 32a are opened and closed alternately. Thus, when the first changeover switch 31 is turned to a shore side (SHORE), the circuit breaker 32a is opened, and then the circuit breaker 32 is closed. Meanwhile, when the first changeover switch 31 is turned to a main switchboard side (MSB), the circuit breaker 32 is opened and then the circuit breaker 32a is closed.

A second switchboard 33 is connected to the power lines 64 for the cargo-handling equipment 63 which is large load. (The second switchboard 33 can be located at any place on the power lines 64.) Then, the electric power 11 from shore is supplied to the second switchboard 33 from the second line 12 via a step-down transformer 42 (450V/6.6 KV). In the second switchboard 33, a voltmeter 35 and a frequency meter 36 are connected to a secondary line of the step-down transformer 42 via a transformer 34, and an insulation-resistance meter 37 with a resistor 38 for measuring the insulation resistance of the line in the second switchboard 33 is installed. In the embodiment, four power lines are provided for the cargo-handling equipment 63, and a second changeover switch 39 is equipped to change over the power lines. The changeover switch 39 operates circuit breakers 40, 41. When the changeover switch 39 is turned to a shore side (SHORE), the circuit breakers 40 are opened, and then the circuit breakers 41 are closed. Meanwhile, when the changeover switch 39 is turned to a main switchboard side (MSB), the circuit breakers 41 are opened, and then the circuit breakers 40 are closed.

Generally, in a case of installing a system for receiving the electric power from shore in an existing ship, large-scale modifications of the main switchboard 75 (for example, connecting a large-diameter cable for receiving the electric power from shore and installing a circuit breaker) are required. However, in a case of installing the electric power supply system 10, a modification of the main switchboard 75 is only to install equipment for synchronization (the transformers 20, 21, voltmeter 23, frequency meter 24, and synchronizer 25, etc.). Furthermore, the location of the electric power-receiving switchboard 16 and the first and second switchboards 26, 33 is not strictly limited. The first switchboard 26 can be installed anywhere between the main switchboard 75 and the propulsion auxiliary equipment 65. The second switchboard 33 can be installed anywhere between the main switchboard 75 and the cargo-handling equipment 63. Thus, it becomes unnecessary to build installation space and dispose the equipment in the switchboards and in a limited-spaced engine room.

Even in a case of a ship to be newly constructed, when it has a main switchboard in a limited space, by adopting the system of the present invention, the electric power from shore can be received without a large modification.

Next, a method of supplying electric power from shore to a ship using the electric power supply system 10 according to one embodiment of the present invention will be explained.

In a state just after the ship arrives at the port, a plurality of the generators 60, 61 are running, and are supplying electric power to the cargo-handling equipment 63 and the ordinary load 67 through the main switchboard 75. The propulsion auxiliary equipment 65 such as a bow thruster is used when the ship arrives at or leaves the port. However, once the ship arrives at the port, the propulsion auxiliary equipment 65 is not used at all while the ship is berthed. Therefore, the circuit breaker 70 for the propulsion auxiliary equipment 65 is opened while the ship is berthed.

In the above state, to switch the electric power from the generators 60, 61 to the electric power 11 from shore, the shore power 11 is connected with the ship so that the shore power 11 is ready to be supplied in the electric power-receiving switchboard 16. By closing the circuit breakers 14, 15, the shore power 11 is ready to be supplied through the high-voltage shore power connection box 11a. Then, the second changeover switch 39 of the second switchboard 33 is operated to change over the electric power for the cargo-handling equipment 63. Namely, the circuit breakers 40 are opened to shut off the electric power from the generators 60, 61 to the cargo-handling equipment 63, and then the circuit breakers 41 are closed. As a result, power supply in the ship is changed over from the generators 60, 61 to the electric power 11 from shore i.e., the second line 12. In this instance, the electric power for the cargo-handling equipment 63 is interrupted for a short period of time (e.g., 1 to 2 seconds). However, such temporary power interruption does not adversely affect operation of the cargo-handling equipment 63. If the cargo-handling equipment 63 is provided with a control device, auxiliary battery power source must be installed, or such control device must be supplied with the electric power 11 from shore because a instantaneous interruption of power supply occurs to the control device. As a result of the switching operation, the cargo-handling equipment 63 is supplied with the electric power 11 from shore.

Next, by operating the first changeover switch 31 of the first switchboard 26, the power line 66 is connected to the first line 13 with the circuit breaker 32. (Since the circuit breakers 32 and 32a are interlocked, when the circuit breaker 32 is closed, the circuit breaker 32a is opened.) Before explanation of the next procedure, a brief explanation will be made on the generators 60, 61 which have been supplying electric power to the main switchboard 75.

The main switchboard 75 is provided with the generators 60, 61. When the load is increased, those generators supply electric power by parallel running. In order to carry out the parallel running of the generators 60, 61 when the generator 60 is running with the circuit breaker 72 closed, firstly the generator 61 is started to generate electric power. Then, the power from the generator 61 is connected to the main switchboard 75 by closing the circuit breaker 73 after synchronizing the phases, frequencies, and voltages of both of the generators 60, 61. This synchronizing operation between the generators 60, 61 can be done manually or automatically by a selector switch 45. Namely, the selector switch 45 can set the parallel running of plural generators manually or automatically. When the selector switch 45 is set at MANU, the parallel running between the generators 60, 61 is done by manual. When the selector switch 45 is set at AUTO, the parallel running between the generators 60, 61 is done automatically according to the quantity of the load.

In the embodiment, the frequency, voltage and phase of the generator 60 and/or the generator 61 are adjusted by manual operation. Since the electric power 11 from shore is supplied to the cargo-handling equipment 63 which requires a large capacity of electric power, either one of the generators 60, 61 is enough to supply electric power to the ordinary load 67 (After the changeover in the second switchboard 33, only the generator 61 is running in the embodiment).

Electric power is supplied from the generator 61 to the main bus bar 62 with the circuit breaker 73. Meanwhile, the electric power 11 from shore is supplied to the power line 66 through the first line 13. In a state that the circuit breaker 70 is open, the voltage, frequency and phase of the main bus bar 62 and those of the electric power 11 from shore are synchronized using the voltmeters 23, the frequency meter 24 and the synchronizer 25. (The first step)

Immediately after the first step, the circuit breaker 70 is closed to connect the power line 66 to the main bus bar 62. In this instance, the electric power 11 from shore is transmitted to the main switchboard 75.

When the ship is supplied with electric power only from the generators, the electric power is transmitted from the main switchboard 75 to the propulsion auxiliary equipment 65 via the power line 66. However, in the case of the present invention, the electric power 11 from shore is carried from the first line 13 to the main switchboard 75 via the power line 66. The direction of the electric power supply in the power line 66 during the ship's berthing is opposite. As a result, just after the circuit breaker 70 is closed, both the electric power 11 from shore and the electric power from the generator 61 are supplied to the main bus bar 62 at the same time. Consequently, temporary parallel operation is carried out. (The second step)

After the temporary parallel operation of the generator 61 and the electric power 11 from shore for several seconds (1 to 2 seconds), the circuit breaker 73 is automatically opened (Because of interlock with the circuit breaker 70, the circuit breaker 73 is automatically opened several seconds after the circuit breaker 70 is closed). Thereby, the electric power supply from the generator 61 is shut off. (The third step) Through the first to the third steps, the electric power supplied to the ship is changed over from the electric power from the generator 61 to the electric power 11 from shore without causing temporary interruption of power supply to the ordinary load 67.

Further, to change over the power supply from the electric power 11 from shore to the generators 60, 61, the opposite procedures of the above are taken. First, one generator (the generator 61 in the embodiment) is started. Then, the circuit breaker 73 is closed to supply electric power from the generator 61 to the main bus bar 62, after synchronizing the frequency and voltage of the main bus bar 62 and those of the generator 61. The generator 61 and the electric power 11 from shore are temporarily operated in parallel; however, after several seconds (1 to 2 seconds), the circuit breaker 70 connecting the power line 66 with the main bus bar 62 is automatically opened. As a result, the electric power for the main bus bar 62 is only from the onboard generator 61.

When more electric power is necessary after the changeover is finished, other generators can supply electric power by parallel running. In a state that the generator 61 alone supplies electric power to the main bus bar 62, the generator 60 is started, and connected to the main bus bar 62 with the circuit breaker 72 after synchronization. If the selector switch 45 is set at AUTO, the parallel running of the generators 60, 61 is automatically done according to the quantity of load.

The second changeover switch 39 of the second switchboard 33 is turned to the main switchboard side (MSB), thereby the circuit breakers 41 are opened and the circuit breakers 40 are closed. Accordingly, the electric power 11 from shore i.e., the electric power from the second line 12 is shut off, and the electric power is supplied to the cargo-handling equipment 63 from the power lines 64 connected with the main bus bar 62.

After the changeover from the shore power 11 to the generator 61 is finished (after the circuit breaker 70 is opened), the circuit breakers 14, 15 are opened to shut off the electric power 11 from shore completely. Then, when the changeover switch 31 of the first switchboard 26 is turned to the main switchboard side (MSB), the circuit breaker 32a is closed and the circuit breaker 32 is opened automatically due to interlock. Then, the electric power from the generators 60, 61 is supplied to the propulsion auxiliary equipment 65 by closing the circuit breaker 70.

Although the embodiment of the present invention has been described in details herein with reference to the accompanying drawings, it is understood that the invention is not limited to the aforementioned embodiment, and that various changes and modifications may be effected therein without departing from the scope or spirit of the invention as defined in the appended claims. For example, the two onboard generators are provided in the embodiment. However, the present invention may be applied to the cases where one generator or more than two generators are provided. Although the switching devices (including the first circuit breaker 70, and the second circuit breakers 72, 73) are installed in the onboard main switchboard in the embodiment, the switching devices may be installed in the switchover panel in the vicinity of the main switchboard.

Further, in the embodiment, synchronizing operation (the synchronization and the parallel operation) of the electric power 11 from shore and onboard electric power is carried out by the manual operation. However, the synchronous operation may be carried out by automatic operation by setting up a proper circuit or programming.

Moreover, if the voltage of a power source used in the ship is high such as 6.6 KV, it is possible to receive the electric power from shore directly by removing the step-down transformers 27, 42.

What is claimed is:

1. A method of supplying electric power from shore to a ship with at least one generator, the ship being berthed in port, comprising:

a first step of synchronizing the electric power from shore with electric power from the generator, a second step of carrying out temporary parallel operation of the electric power from shore and the electric power from the generator after the synchronizing of the first step, and a third step of shutting off the electric power from the generator to supply the electric power from shore to the ship after the temporary parallel operation of the second step, wherein the ship is provided with cargo-handling equipment requiring a large capacity of electric power and being usually supplied with the electric power from the generator, and a line of the electric power from shore is divided into a second line and a first line, the second line being used to supply the electric power from shore to the cargo-handling equipment, the first line being used to supply the electric power from shore to ordinary load other than the cargo-handling equipment, the method further comprising:

a first process of supplying the electric power from shore to the cargo-handling equipment by connecting the second line to the cargo-handling equipment after shutting off the electric power from the generator to the cargo-handling equipment, and a second process of supplying the electric power from shore to the ordinary load via the first line by carrying out the first step to the third step.

2. A method of supplying electric power from shore to a ship according to claim 1, the ship being provided with not only the cargo-handling equipment and the ordinary load but also propulsion auxiliary equipment requiring a large capacity of electric power, wherein supply of the electric power from shore to the ordinary load of the ship via the first line is carried out by using a part or a whole of a power line for the propulsion auxiliary equipment.

3. A system for supplying electric power from shore to a ship being berthed in port, the ship being provided with not only ordinary load including onboard lighting equipment and electronic devices supplied with electric power from an onboard generator but also propulsion auxiliary equipment and cargo-handling equipment both requiring a large capacity of electric power, comprising:

an electric power-receiving switchboard receiving the electric power from shore, the electric power-receiving switchboard including circuit breakers being respectively connected to divided first and second lines for turning on and off the electric power from shore to the first and second lines;

a first switchboard operable to change over from the first line to a power line for the propulsion auxiliary equipment by using a first changeover switch;

a second switchboard operable to change over from the second line to a power line for the cargo-handling equipment by using a second changeover switch; and switching devices including a first circuit breaker and a second circuit breaker, the first circuit breaker closing after synchronization of the electric power from the generator and the electric power from shore transmitted via the power line for the propulsion auxiliary equipment, the second circuit breaker opening to shut off the electric power from the generator to the ordinary load via a main bus bar after temporary parallel operation of the electric power from shore and the electric power from the generator.

4. A system for supplying electric power from shore to a ship according to claim 3, wherein the switching devices are provided in an onboard main switchboard or in a switchboard located adjacent to the main switchboard.

* * * * *